United States Patent [19]

Elmer

[11] Patent Number: 5,445,561
[45] Date of Patent: Aug. 29, 1995

[54] REVOLVING BLADE SKINNING DEVICE AND REVOLVING BLADE THEREOF

[75] Inventor: Stefan Elmer, Ötisheim, Germany

[73] Assignee: Schmid & Wezel GmbH & Co., Maulbronn, Germany

[21] Appl. No.: 261,906

[22] Filed: Jun. 15, 1994

[30] Foreign Application Priority Data

Jun. 16, 1993 [DE] Germany .......... 43 19 949.6

[51] Int. Cl.⁶ .............................................. A22B 5/16
[52] U.S. Cl. .................................. 452/133; 452/164; 30/347; 30/351
[58] Field of Search ........... 452/133, 132, 125, 164, 452/169, 149; 30/347, 355, 216, 219, 351

[56] References Cited

U.S. PATENT DOCUMENTS

| | | | |
|---|---|---|---|
| 1,506,510 | 8/1924 | Thuau | 452/133 |
| 1,604,642 | 10/1926 | Hausamann | 452/133 |
| 3,184,785 | 5/1965 | Wezel | 30/347 |
| 3,358,370 | 12/1967 | Logan | 30/347 |
| 4,472,880 | 9/1984 | Johansson | 30/347 |
| 5,009,011 | 4/1991 | Johansson | 30/347 |

FOREIGN PATENT DOCUMENTS

| | | | |
|---|---|---|---|
| 44512 | 8/1931 | Germany | 452/133 |
| 129795 | 9/1932 | Germany . | |
| 653818 | 12/1937 | Germany . | |
| 661268 | 6/1938 | Germany . | |
| 948391 | 8/1956 | Germany . | |
| 4130874A1 | 3/1993 | Germany . | |

OTHER PUBLICATIONS

English Abstract of the above–noted art.

Primary Examiner—Willis Little
Attorney, Agent, or Firm—Jones, Tullar & Cooper

[57] ABSTRACT

A revolving blade skinning device and blade is described, in which a revolving blade is rotatably arranged between two covers, and wherein the revolving blade is embodied such that cutting edge areas with constant cutting edge radii alternate with notches. In accordance with the present invention it is provided that the notches are embodied V-shaped and as cutting edges, that they respectively take up an angle of 10° to 20° and the cutting edge areas respectively an angle of 25° to 35°, and that furthermore the revolving blade projects past the covers in such a way, that in the process the cutting edge radius of the revolving blade is maximally greater by 1.5 mm than the covers.

10 Claims, 2 Drawing Sheets

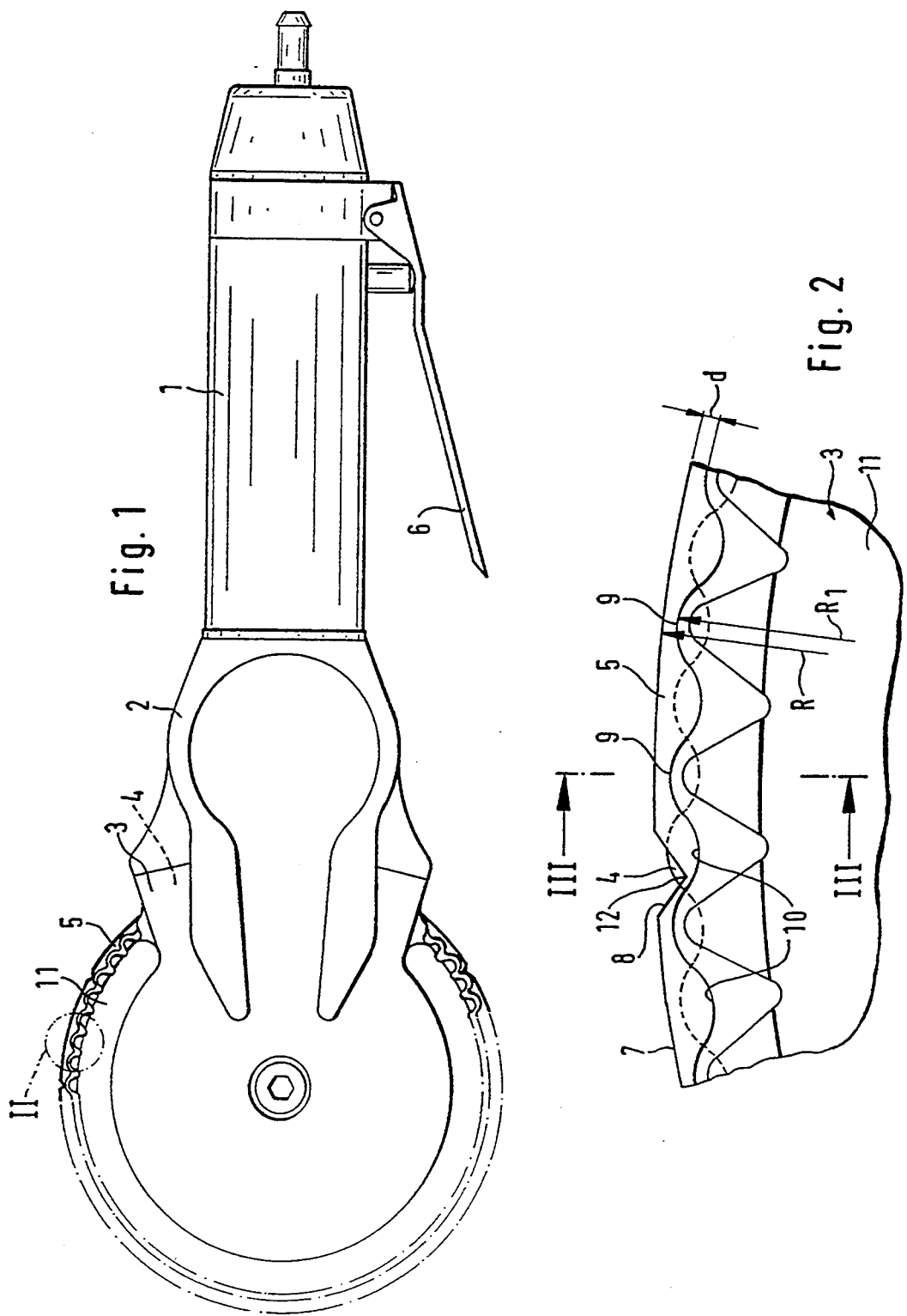

REVOLVING BLADE SKINNING DEVICE AND REVOLVING BLADE THEREOF

BACKGROUND OF THE INVENTION

1. Field of The Invention

The present invention relates to a revolving blade skinning device in which a revolving blade is rotatably arranged between two covers. The revolving blade is embodied such that cutting edge areas with constant cutting edge radii alternate with notches, wherein the cutting edge radius is equal to the radius of the revolving blade, and wherein the centers of the circles of the cutting edge radius and of the radius of the revolving blade coincide.

2. Prior Art

A revolving blade skinning device of this type is known from DE-PS 653 818. The notches in this known revolving blade skinning device are semi-circular and are disposed with relatively short spacing along the circumference of the revolving blade.

Similar revolving blade skinning devices are described in DE-PS 661 268, DE-OS 41 30 874 and in Austrian Letters Patent 129 795.

SUMMARY OF THE INVENTION

It is the object of the present invention to provide a revolving blade skinning device of the type mentioned, which has improved guidance and cutting properties.

This object is attained by the present invention in that the notches are embodied as V-shaped and as cutting edges sharpened on both sides, the notches respectively take up an angle of 10° to 20° and the cutting edge areas respectively an angle of 25° to 35°, and further in that the revolving blade projects past the covers in such a way that in the process the cutting edge radius of the revolving blade is maximally greater by 1.5 mm than the greatest radial extent of the covers.

By means of the very special design of the revolving blade, wherein cutting edge areas having the radius of the revolving blade alternate with V-shaped notches embodied as cutting edges, and furthermore by a projection of the cutting edges which, however, is only increased by a small amount of the radius, maximally 1.5 mm, the cutting properties are optimized such that on the one hand the cutter cleanly cuts the connective tissue and, on the other hand, satisfactory guidance of the revolving blade skinning device ensues, so that it is simultaneously prevented that the revolving blade cuts either the skin or the meat.

BRIEF DESCRIPTION OF THE DRAWINGS

An exemplary embodiment of the present invention will be described in detail below by means of the drawings. Shown are:

FIG. 1, which is an exemplary embodiment of the device of the present invention;

FIG. 2, which is an enlarged view of the portion II of FIG. 1;

DETAILED DESCRIPTION OF THE PREFERRED EMBODIMENTS

Figure 3:
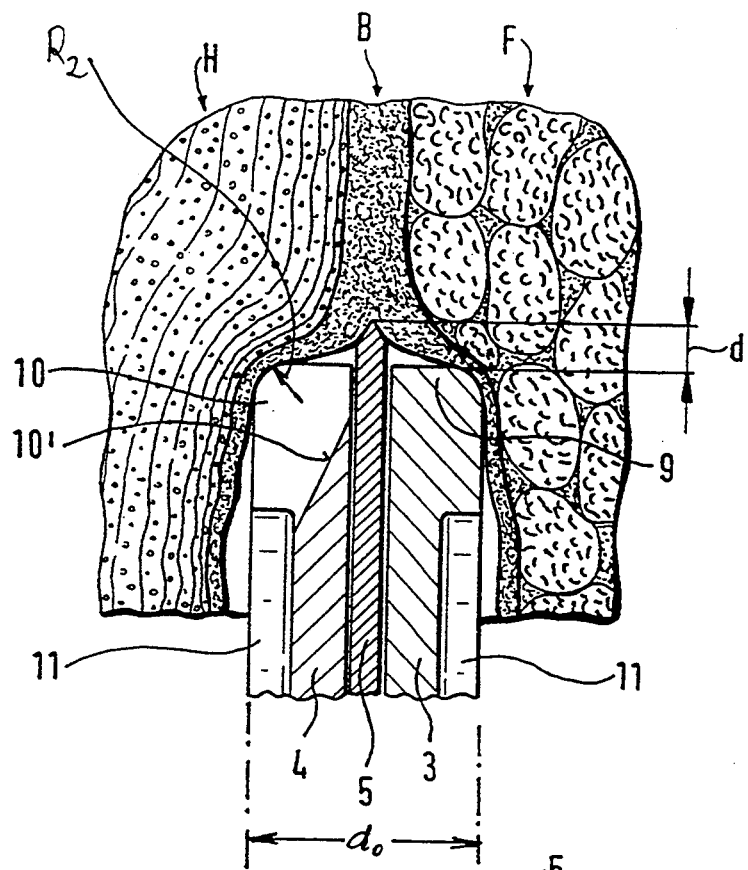
FIG. 3, which is a section along the line III—III of FIG. 2, shown at the time of introduction of the revolving blade skinning device into the connective tissue between skin and meat of a carcass.

The revolving blade skinning device has a handle 1 and a housing head 2, which makes a transition into the covers 3, 4 (wherein in FIG. 1 the cover 4 is on the side of the revolving blade skinning device not shown). A revolving blade 5 is disposed between the covers 3, 4 and is rotated by a drive. The drive is disposed in the interior of the handle 1. It is, for example, a motor operated by compressed air with a gear located in the housing head 2. The motor is actuated by pressing the operating lever 6.

Figure 4:
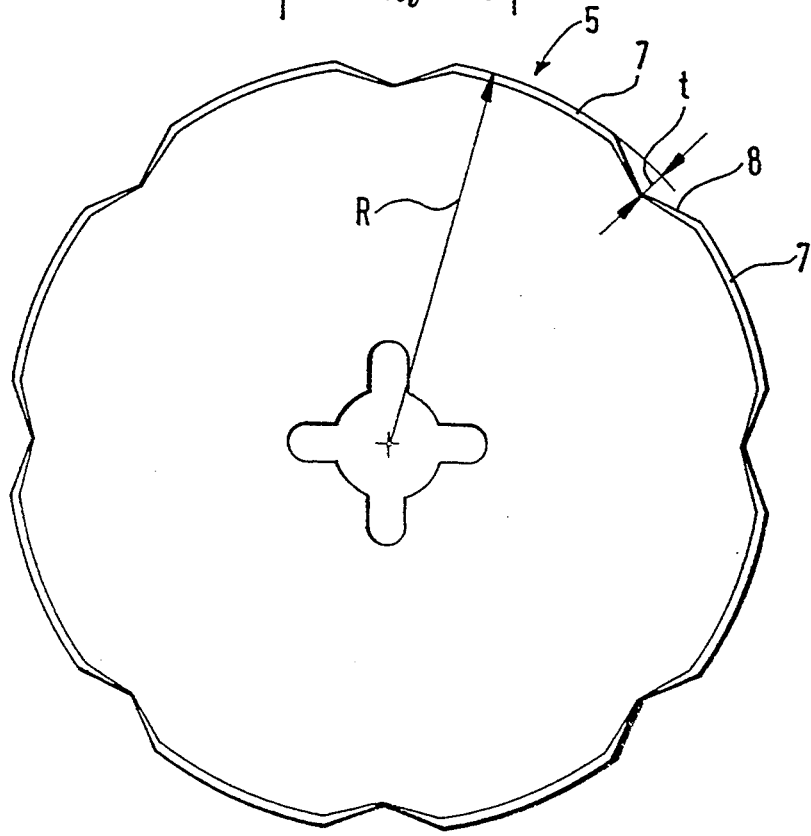
FIG. 4, which illustrates a revolving blade according to the present invention.

The revolving blade 5 is shown in FIG. 4. Its cross section can be seen in FIG. 3. It is designed as follows: cutting edge areas 7 alternate with V-shaped cutting notches 8. The cutting edge areas 7 as well as the cutting notches 8 are sharpened on both sides. The cutting edge areas 7 have a cutting edge radius R which is equal to the radius R of the revolving blade 5. In the exemplary embodiment respectively one cutting edge area 7 and one cutting notch 8 occupy an angled area of 45°. This means that essentially a round cutting edge with a constant radius R (formed by the cutting edge areas 7) is interrupted by cutting notches 8. The cutting edge areas 7 take up an angle of between 10° and 20°. In comparison with the radius R of the revolving blade 5, the notches have a depth t of approximately 1.5 to 2.5 mm.

As can be seen in FIG. 3, the covers 3 and 4 are embodied to be wavy at the rim, i.e. such that respectively humps 9 alternate with depressions 10. The transitions of the humps 9 to the depressions 10 are rounded in all planes. Catching is prevented by means of this and an even, drawing cut is assured. In this case the covers 3, 4 are offset with respect to each other in such a way that a hump 9 of one cover is respectively located opposite the depression 10 of the other cover, as can be seen in FIG. 2 by comparing the depressions 10 and the humps 9, for example at the place where section III—III is located. In this case the radius R of the cutting edge area 7 of the revolving blade 5 has been matched with the greatest radial extension R1 of the covers 3, 4 in such a way that the difference $(R-R1)$, which is indicated by d in FIG. 2, maximally is 1.5 mm, but preferably only 1 mm (also see FIG. 3). The radially outermost end areas of the covers 3, 4 which have the radius $R_1$ are rounded over a radius $R_2$.

The section in accordance with FIG. 3 is located in a hump 9 on the side of the cover 3 and in a depression 10 on the side of the cover 4. The depression 10 has walls 10' which are respectively obliquely inclined towards the revolving blade 5. The covers 3, 4 each have a clear recess 11 radially inward from the cutting edge beads which are formed by the humps 9 and depressions 10. The clear recesses 11 on both sides prevent the metal parts from adhering to the skin H or the meat F.

The thickness of the revolving blade 5 is 0.4 mm, for example, maximally 1.5 mm. For exact guidance and cutting it is advantageous if the thickness $d_0$ of both covers 3, 4 and of the revolving blade 5 together is maximally 6 mm. It is assured by this design of the two covers and of the revolving blade that, as can be seen in FIG. 3, the outer end of the two covers 3, 4 are used quasi as the guidance between the skin H and the meat F of the revolving blade 5, which only slightly projects beyond the outer contour (max. radius R1) of the covers 3, 4, so that the revolving blade 5 itself can be well directed by the operator in such a way that it only cuts the intermediate connective tissue B and in the process it is possible to avoid injuring the skin H and the meat F. Cutting by means of the cutting edge areas 7 is reinforced in that the cutting notches 8 cut those areas where, when the revolving blade skinning device is pushed, the connective tissue B is pressed into the notches 12 between the hump 9 of the one cover 3 and the hump 9 of the other cover 4, which is disposed offset thereto. The guidance of the revolving blade 5 and the cutting capability are in this way matched such that the desired effect of assuredly cutting in the area of the connective tissue B without injury to the skin H and the meat F is optimally achieved.

What is claimed is:

1. A revolving blade skinning device, comprising:
   a handle;
   pair of covers mounted to the handle;
   revolving blade mounted between said pair of covers; and
   means for rotating the revolving blade, wherein:
   the revolving blade includes alternating cutting edge areas and notches;
   the cutting edge areas have a cutting edge radius that is equal to the radius of the revolving blade was inserted therefor.
   the cutting edges are sharpened on both sides and each extend over an angle of 25° to 35°;
   the center of the revolving blade and those of the cutting edges coincide;
   the notches are V-shaped and each extend over an angle of 10° to 20° and
   the revolving blade projects past the covers to a maximal extent of 1.5 mm.

2. The revolving blade skinning device as defined in claim 1, further wherein:
   the thickness of the revolving blade is maximally 1.5 mm.

3. The revolving blade skinning device as defined in claim 2, further wherein:
   the thickness of the revolving blade is approximately 0.4

4. The revolving blade skinning device as defined in claim 1, further wherein:
   the thickness of the two covers and the revolving blade is maximally 6 mm.

5. The revolving blade skinning device as defined in claim 1, further wherein:
   each cover includes a clear recess which extend inwardly from its outer edge.

6. A revolving blade skinning device, comprising:
   a handle;
   a pair of covers mounted to the handle;
   a revolving blade mounted between said pair of covers; and
   means for rotating the revolving blade, wherein:
   the revolving blade includes alternating cutting edges and notches;
   the radius of the revolving blades equals the radius of the cutting edges;
   the cutting edges are sharpened on both sides and each extend over an angle of 25° to 35°;
   the center of the revolving blade and those of the cutting edges coincide;
   the notches are V-shaped and each extend over an angle of 10° to 20°; and
   the revolving blade projects past the covers to a maximal extent of 1.5 mm, wherein:
   the radially outermost edges of both covers form alternating humps and depressions; and
   said covers are mounted to said handle such that the humps of one cover overlap the depressions of the other cover.

7. The revolving blade skinning device as defined in claim 6 further wherein:
   the transition areas between the humps and depressions are rounded.

8. The revolving blade skinning device as defined in claim 7, further wherein:
   the outer area of the covers is rounded.

9. The revolving blade skinning device as defined in claim 6, further wherein:
   each depression defines a surface obliquely inclined toward the revolving blade.

10. A revolving blade for a revolving blade skinning device, having:
    a plurality of cutting edges with a constant radius; and
    a plurality of notches arranged to alternate with respective ones of the plurality of cutting edges, wherein:
    the cutting radius of the cutting edges equals that of the revolving blade;
    the center of the revolving blade and those of the cutting edges coincide;
    the plurality of notches are V-shaped and each extend over an angle of 10° to 20°; and
    the plurality of cutting edges each extend over an angle of 25° to 35°.

* * * * *